(12) United States Patent  (10) Patent No.: US 11,090,519 B2
Fazzio  (45) Date of Patent: Aug. 17, 2021

(54) FIRE EXTINGUISHER SYSTEM AND METHOD OF MANUFACTURING

(71) Applicant: Kidde Technologies, Inc., Wilson, NC (US)

(72) Inventor: Mark P. Fazzio, Wilson, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 189 days.

(21) Appl. No.: 16/177,900

(22) Filed: Nov. 1, 2018

(65) Prior Publication Data

US 2020/0139172 A1 May 7, 2020

(51) Int. Cl.
*A62C 3/08* (2006.01)
*A62C 37/42* (2006.01)
*F16K 1/30* (2006.01)

(52) U.S. Cl.
CPC ............... *A62C 3/08* (2013.01); *A62C 37/42* (2013.01); *F16K 1/305* (2013.01); *F16K 1/307* (2013.01)

(58) Field of Classification Search
CPC .......... F16K 1/305; F16K 1/307; F16K 1/308; A62C 3/08; A62C 37/42; Y10T 137/3662; Y10T 137/3724; Y10T 137/6011; Y10T 137/6851
See application file for complete search history.

(56) References Cited

U.S. PATENT DOCUMENTS

| | | | | |
|---|---|---|---|---|
| 1,263,291 A | * | 4/1918 | Schultz | A62C 35/023 169/9 |
| 1,328,578 A | * | 1/1920 | Malby | F17C 13/04 251/220 |
| 2,399,553 A | * | 4/1946 | Lindsay | A62C 3/08 169/16 |
| 3,552,495 A | * | 1/1971 | Fiero | A62C 35/08 169/28 |
| 4,159,744 A | * | 7/1979 | Monte | A62C 35/08 169/26 |
| 5,632,337 A | * | 5/1997 | Sundholm | A62C 35/023 169/9 |

(Continued)

FOREIGN PATENT DOCUMENTS

| | | | |
|---|---|---|---|
| DE | 102008016933 A1 | 10/2009 | |
| DE | 102004004570 B4 * | 8/2011 | ............. F16K 1/305 |
| ES | 2255414 | 6/2006 | |

OTHER PUBLICATIONS

European Search Report for European Application No. 19206480.6-1113, dated Mar. 17, 2020, 6 pages.

*Primary Examiner* — Jessica Cahill
(74) *Attorney, Agent, or Firm* — Cantor Colburn LLP

(57) ABSTRACT

An assembly for a fire extinguisher system includes a fire extinguisher fitting that extends into a fire extinguisher container and a fill adapter. The fitting defines a fitting bore through which a connection portion of a pressure monitoring device at least partially extends and a fitting flange that is disposed about the fitting and is disposed parallel to a flange of the pressure monitoring device. The fill adapter includes an adapter housing and an adapter shaft. The adapter housing is arranged to be disposed about the pressure monitoring device. The adapter shaft that at least partially extends through the adapter housing. The adapter shaft is arranged to engage a monitoring housing of the pressure monitoring device.

8 Claims, 2 Drawing Sheets

(56) References Cited

U.S. PATENT DOCUMENTS

| | | | |
|---|---|---|---|
| 6,530,396 B1* | 3/2003 | Frey | F16K 1/307 |
| | | | 137/557 |
| 6,571,834 B2* | 6/2003 | Takeda | F16K 1/307 |
| | | | 141/18 |
| 8,695,651 B2* | 4/2014 | Frenal | F16K 1/303 |
| | | | 141/347 |
| 9,072,925 B2 | 7/2015 | Bermes et al. | |
| 9,333,380 B2 | 5/2016 | Ehlers et al. | |
| 10,226,656 B2* | 3/2019 | Frasure | A62C 35/023 |
| 10,352,472 B2* | 7/2019 | Baxendell | F16K 17/403 |
| 10,781,712 B2* | 9/2020 | Nakamura | F16K 51/00 |
| 2008/0078467 A1* | 4/2008 | Home | F16K 1/305 |
| | | | 141/95 |
| 2009/0032272 A1* | 2/2009 | Duncan | A62C 13/64 |
| | | | 169/85 |
| 2013/0105037 A1* | 5/2013 | Frenal | B67C 3/26 |
| | | | 141/1 |
| 2014/0102562 A1* | 4/2014 | Morales | F16K 27/02 |
| | | | 137/557 |
| 2014/0157890 A1* | 6/2014 | Malinen | A62C 37/50 |
| | | | 73/299 |

* cited by examiner

FIRE EXTINGUISHER SYSTEM AND METHOD OF MANUFACTURING

BACKGROUND

The present disclosure relates to a fire extinguisher system having a common fill and pressure monitoring device port.

Aircraft fire extinguishers may include a pressure vessel having multiple ports that serve distinct purposes. At least one port may serve as a fill port to fill the pressure vessel, another port may serve as an outlet port, and yet another port may serve as a port that receives a pressure sensor. Each port may require extensive manufacturing steps to provide the port with the pressure vessel. The sealing of each port may add additional components as well as increase the weight of the fire extinguisher and present potential failure modes.

SUMMARY

Disclosed is a fire extinguisher system that includes a first extinguisher fitting and an assembly that extends into the fitting. The fire extinguisher fitting extends into a fire extinguisher container. The assembly includes a pressure monitoring device and a fill adapter. The pressure monitoring device has a connection portion that extends into the fitting, a monitoring housing, and a flange between the connection portion and the monitoring housing. The fill adapter has an adapter housing disposed about the pressure monitoring device and an adapter shaft that engages the pressure monitoring device.

Also disclosed is an assembly for a fire extinguisher system that includes a fire extinguisher fitting that extends into a fire extinguisher container and a fill adapter. The fitting defines a fitting bore through which a connection portion of a pressure monitoring device at least partially extends and a fitting flange that is disposed about the fitting and is disposed parallel to a flange of the pressure monitoring device. The fill adapter includes an adapter housing and an adapter shaft. The adapter housing is arranged to be disposed about the pressure monitoring device. The adapter shaft that at least partially extends through the adapter housing. The adapter shaft is arranged to engage a monitoring housing of the pressure monitoring device.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
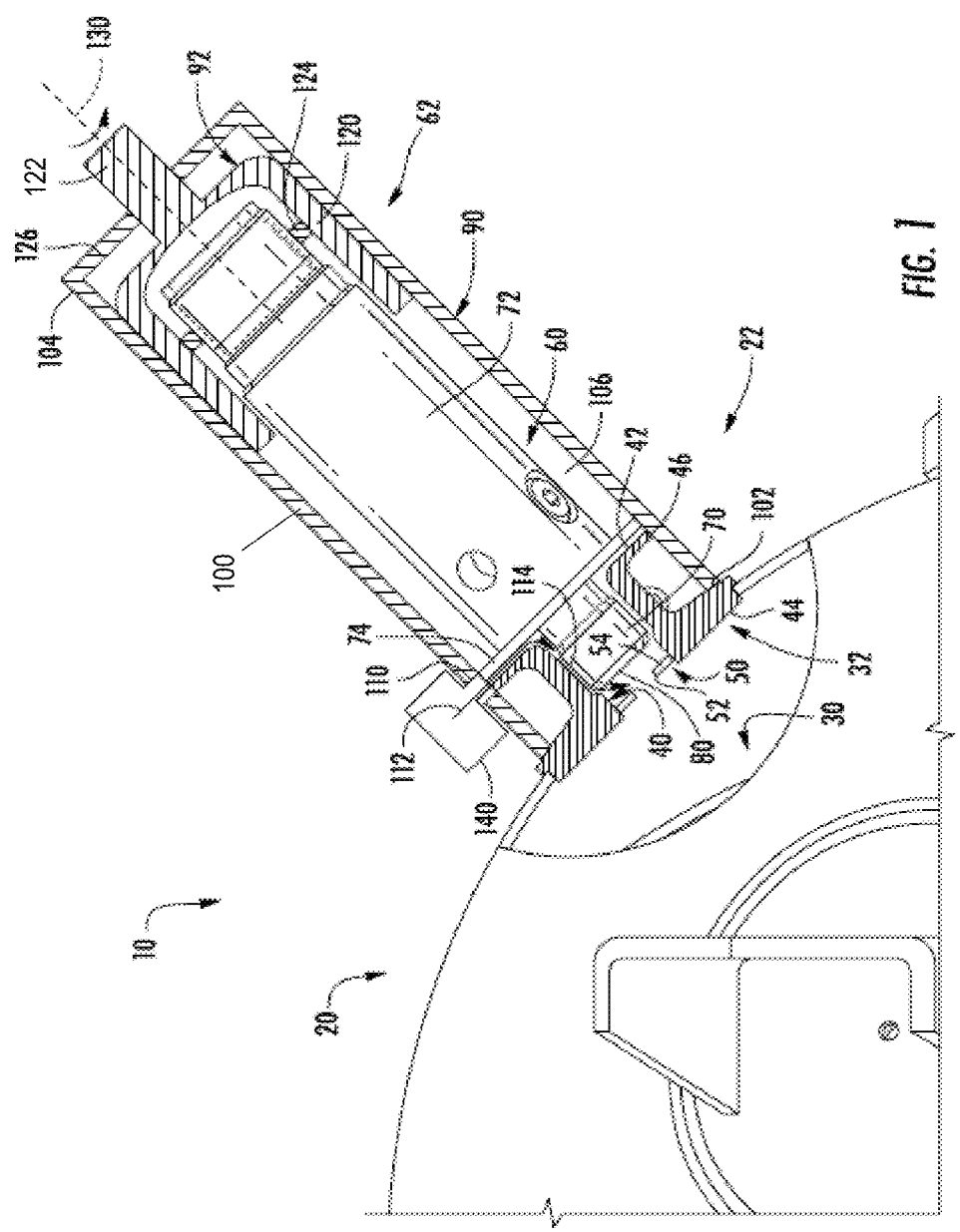
FIG. 1 is a partial view of a fire extinguisher system having an assembly in a first position.
Figure 2:
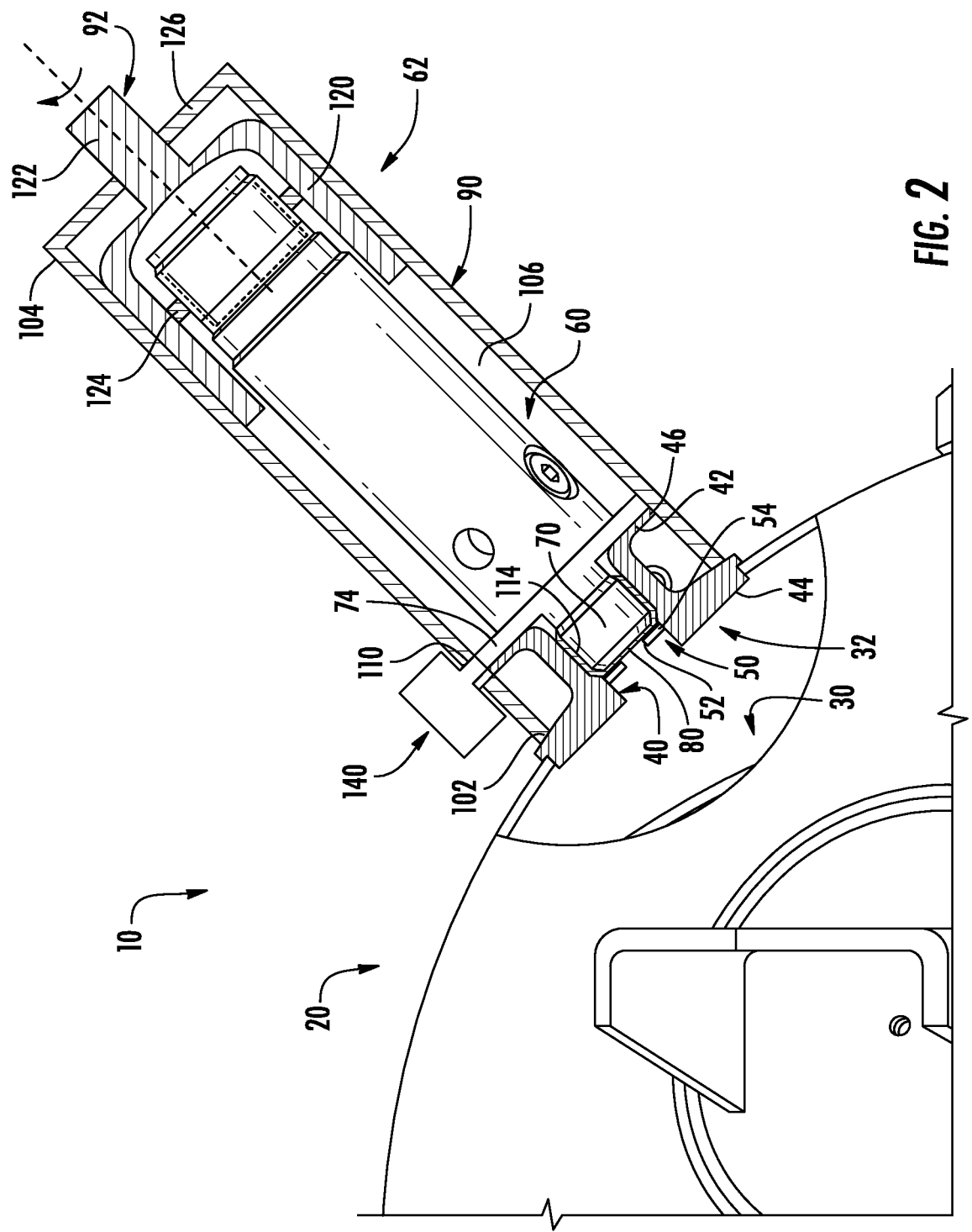
FIG. 2 is a partial view of the fire extinguisher system having the assembly in a second position.

Referring to FIGS. 1 and 2, a fire extinguisher system 10 may be provided with a vehicle such as an aircraft. The fire extinguisher system 10 is arranged to be charged or filled with an agent and/or pressurizing fluid or fluids and deliver the agent to a delivery system to facilitate the extinguishing or suppression of a thermal event. The fire extinguisher system 10 is provided with a fire extinguisher container 20 and an assembly 22 arranged to facilitate the charging or filling of the fire extinguisher container 20 with the agent and/or pressurizing fluid or fluids.

The fire extinguisher container 20 is disposed about or defines an internal volume 30 that receives the agent and/or pressurizing fluid or fluids. The internal volume 30 may be charged with the agent and/or pressurizing fluid or fluids through a fitting 32 that extends into the fire extinguisher container 20.

The fitting 32 defines a fitting bore 40 that extends between a first fitting end 42 and a second fitting end 44. The fitting bore 40 may be a threaded bore. The first fitting end 42 defines or includes a fitting flange 46 that extends about the fitting 32. The fitting flange 46 defining a sealing surface. The second fitting end 44 is disposed opposite the first fitting end 42 and extends into the fire extinguisher container 20. The fitting 32 defines a stepped surface or joining surface that extends from the second fitting end 44 towards the first fitting end 42, to facilitate the joining of the fitting 32 with the fire extinguisher container 20.

A sealing member 50, such as a gasket, is disposed within the fitting bore 40 and disposed proximate the second fitting end 44. The sealing member 50 may be provided as a separate component or may be at least partially defined by the fitting 32. The sealing member 50 defines an opening 52 and a seating surface or sealing surface 54 that faces towards the first fitting end 42. The opening 52 may be a central opening that extends completely through the sealing member 50. The opening 52 may define an inlet port that is fluidly connected to the internal volume 30 of the fire extinguisher container 20.

The fitting 32 is arranged to operate as both a fill port and a pressure monitoring port. The fitting 32 facilitates the filling of the internal volume 30 of the fire extinguisher container 20 as well as facilitates the monitoring of a pressure within the internal volume 30 of the fire extinguisher container 20 via a pressure monitoring device. The multipurpose features of the fitting 32 reduces the number of operations and components in manufacturing the fire extinguisher system 10 to reduce the overall cost and weight of the fire extinguisher system 10. The multi-purpose features of the fitting 32 also reduces the total number of components and potential leak paths.

The assembly 22 is arranged to cooperate with the fitting 32 to fill the fire extinguisher container 20 with the agent and/or pressurizing fluid or fluids as well as to install or assemble a pressure monitoring device 60 to the fire extinguisher container 20. The assembly 22 includes the pressure monitoring device 60 and a fill adapter 62.

The pressure monitoring device 60 is arranged to monitor an internal pressure within the internal volume 30 of the fire extinguisher container 20 through the fitting bore 40 of the fitting 32. The pressure monitoring device 60 includes a connection portion 70, a monitoring housing 72 from which the connection portion 70 extends, and a flange 74.

The connection portion 70 extends into the fitting bore 40 of the fitting 32. The connection portion 70 may be a threaded member that cooperates with the threads of the fitting bore 40 to connect the pressure monitoring device 60 to the fitting 32 and ultimately the fire extinguisher container 20. The connection portion 70 includes an end surface 80 that may engage the sealing surface 54 of the sealing member 50 when the pressure monitoring device 60 is seated within the fitting 32. The end surface 80 may define an opening that fluidly connects a pressure sensor or other monitoring hardware that may be disposed within the monitoring housing 72 with the internal volume 30 of the fire extinguisher container 20.

The connection portion 70 that extends from the monitoring housing 72 may be provided with radial compression sealing features that engage the fitting bore 40 of the fitting 32. The end surface 80 may be provided with sealing features, such as o-rings, that engage/disengage the sealing surface 54 of the sealing member 50 of the fitting 32 of the fire extinguisher container 20.

The flange 74 is disposed between the connection portion 70 and the monitoring housing 72. The flange 74 may circumferentially extend about portions of at least one of the monitoring housing 72 and/or the connection portion 70. The flange 74 is disposed parallel to the fitting flange 46. The flange 74 may engage the fitting flange 46 of the fitting 32 when the pressure monitoring device 60 is seated within the fitting 32.

The fill adapter 62 is arranged to facilitate the installation of the pressure monitoring device 60 into the fitting 32 as well as to facilitate the filling of the internal volume 30 of the fire extinguisher container 20. The fill adapter 62 is arranged to be disposed over or disposed about the pressure monitoring device 60. The fill adapter 62 includes an adapter housing 90 and an adapter shaft 92 that extends at least partially through the adapter housing 90.

The adapter housing 90 includes an adapter wall 100 that extends from a first adapter end 102 to a second adapter end 104. The first adapter end 102 may be an open end such that a portion of the adapter wall 100 at the first adapter end 102 engages at least one of the fitting 32 and/or the fire extinguisher container 20. The second adapter end 104 is disposed opposite the first adapter end 102 and may define a closed end such that the adapter wall 100 and the second adapter end 104 at least partially define an adapter cavity 106. The engagement between the adapter wall 100 at the first adapter end 102 with at least one of the fitting 32 and/or the fire extinguisher container 20 at least partially seals the adapter cavity 106.

The adapter wall 100 defines a fill port 110 that extends completely through the adapter wall 100. The fill port 110 is fluidly connected to the internal volume 30 of the fire extinguisher container 20 through a fill path 112 that is defined between the fitting flange 46, the flange 74, the fitting bore 40, an outer surface 114 of the connection portion 70, and the opening 52 of the sealing member 50. The fill path 112 is defined such that agent and or pressurizing fluid or fluids may flow between the fitting bore 40 and the outer surface 114 of the connection portion 70 while the internal volume 30 of the fire extinguisher container 20 is being filled or charged. The fill path 112 may be defined while the fitting flange 46 is spaced apart from the flange 74, as shown in FIG. 1. The fill path 112 may be sealed or not defined while the fitting flange 46 engages the flange 74, as shown in FIG. 2.

The adapter shaft 92 includes a first portion 120 and a second portion 122 that extends from the first portion 120. The first portion 120 is disposed within the adapter cavity 106 and is arranged to engage the pressure monitoring device 60. More specifically, the first portion 120 is arranged as an open ended cup, forked member, or the like that is disposed about and engages at least a portion of the monitoring housing 72 of the pressure monitoring device 60. In at least one embodiment, a finger, a nub, or engagement member 124 extends from an inner surface of the first portion 120 and engages the monitoring housing 72. A frictional member such as a rubber pad, textured surface, or the like may be disposed on an end of the engagement member 124 that engages the monitoring housing 72. The engagement member 124 may also engage tool surfaces such as wrench flat, a spanner wrench, or the like. The second portion 122 extends from the first portion 120 and through an end wall 126 of the adapter housing 90 that is disposed at the second adapter end 104.

The adapter shaft 92 is rotatable about an axis of rotation 130 to selectively seat the pressure monitoring device 60 within or with the fitting 32. The adapter shaft 92 is arranged to rotate about the axis of rotation 130 relative to the adapter housing 90 while a torsional load is applied to the second portion 122 such that the first portion 120 and the second portion 122 of the rotate about the axis of rotation 130.

A method of manufacturing and filling the fire extinguisher container 20 of the fire extinguisher system 10 may be performed as follows. The fitting 32 may be joined or secured to the fire extinguisher container 20. The connection portion 70 of the pressure monitoring device 60 may be at least partially threaded into the fitting bore 40 of the fitting 32. The adapter housing 90 of the fill adapter 62 may be disposed about the pressure monitoring device 60. The disposing of the adapter housing 90 about the pressure monitoring device 60 engages the adapter shaft 92 of the fill adapter 62 with the monitoring housing 72 of the pressure monitoring device 60. The first adapter end 102 may engage at least one of the fitting 32 and the fire extinguisher container 20.

The adapter shaft 92 may be rotated in a first direction about the axis of rotation 130 such that the pressure monitoring device 60 is moved relative to the fitting 32 to space the flange 74 apart from the fitting flange 46. The rotation of the adapter shaft 92 and the connection portion 70 of the pressure monitoring device 60 leads to the pressure monitoring device 60 being loosely threaded into the fitting bore 40 of the fitting 32 and the flange 74 of the pressure monitoring device 60 being spaced apart from the fitting flange 46 of the fitting 32 to define a first position of the assembly 22 relative to the fire extinguisher container 20. The spacing the flange 74 of the pressure monitoring device 60 apart from the fitting flange 46 of the fitting 32 facilitates the definition of the fill path 112 and filling/pressurization of the fire extinguisher container 20.

A fill connector 140 may be inserted into the fill port 110 that is defined within the adapter wall 100 of the adapter housing 90 or a fill device may be connected to the fill port 110. An agent may flow from the fill connector 140 or fill device through the fill port 110 and into the fill path 112. The agent may at least partially fill the internal volume 30 of the fire extinguisher container 20. The filling of the internal volume 30 may cease responsive to a predetermined pressure within the fire extinguisher container 20 being achieved.

The adapter shaft 92 may be rotated in a second direction, which is disposed opposite the first direction, about the axis of rotation 130 such that the pressure monitoring device 60 is moved relative to the fitting 32. The adapter shaft 92 is rotated until at least one of the flange 74 of the pressure monitoring device 60 engages the fitting flange 46 and/or the end surface 80 of the connection portion 70 of the pressure monitoring device 60 engages the sealing surface 54 of the sealing member 50 to seal the opening 52 of the sealing member 50 to define a second position or sealing position of the assembly 22 relative to the fire extinguisher container 20.

The adapter housing 90 and the adapter shaft 92 of the fill adapter 62 may be removed from the pressure monitoring device 60. The pressure monitoring device 60 may then be sealed to the fitting 32 by connecting the flange 74 of the pressure monitoring device 60 to the fitting flange 46. The flange 74 and the fitting flange 46 may be connected to each other through fastening, welding, or the like.

The assembly 22 reduces total part count of the fire extinguisher system 10 as compared to other configurations and reduces production processes (such as welding, machining, cleaning, threading, torqueing, leak checking) which results in lower cost and faster production time of the fire extinguisher system 10.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fire extinguisher system, comprising:
   a fire extinguisher fitting that extends into a fire extinguisher container; and
   an assembly that extends into the fitting, the assembly, comprising
      a pressure monitoring device having a connection portion that extends into the fitting, a monitoring housing, and a flange between the connection portion and the monitoring housing, and
      a fill adapter having an adapter housing disposed around the pressure monitoring device and an adapter shaft that engages the pressure monitoring device.

2. The fire extinguisher system of claim 1, wherein the adapter shaft includes a first portion that is within the adapter housing and a second portion that extends from the first portion and through the adapter housing.

3. The fire extinguisher system of claim 1, wherein the fill adapter defines a fill port.

4. The fire extinguisher system of claim 3, wherein the fitting includes a fitting bore that extends between a first fitting end and a second fitting end, the fitting bore extending into the fire extinguisher container.

5. The fire extinguisher system of claim 4, wherein a sealing member is disposed within the fitting bore, the sealing member defining an opening.

6. The fire extinguisher system of claim 4, wherein the fitting defines a fitting flange at the first fitting end, the fitting flange being parallel to the flange of the pressure monitoring device.

7. The fire extinguisher system of claim 6, wherein a fill path is defined between the fitting flange, the flange, the fitting bore, and an outer surface of the connection portion.

8. The fire extinguisher system of claim 7, wherein the fill port is fluidly connected to an internal volume of the fire extinguisher container through the fill path.

\* \* \* \* \*